(12) United States Patent
Nishimura et al.

(10) Patent No.: US 9,022,574 B2
(45) Date of Patent: May 5, 2015

(54) DISPLAY DEVICE

(75) Inventors: Yoshifumi Nishimura, Tokyo (JP); Takayuki Okada, Tokyo (JP)

(73) Assignee: NEC Display Solutions, Ltd., Tokyo (JP)

( * ) Notice: Subject to any disclaimer, the term of this patent is extended or adjusted under 35 U.S.C. 154(b) by 484 days.

(21) Appl. No.: 13/496,478

(22) PCT Filed: Sep. 18, 2009

(86) PCT No.: PCT/JP2009/066363
§ 371 (c)(1),
(2), (4) Date: Mar. 15, 2012

(87) PCT Pub. No.: WO2011/033648
PCT Pub. Date: Mar. 24, 2011

(65) Prior Publication Data
US 2012/0176586 A1    Jul. 12, 2012

(51) Int. Cl.
*G03B 21/16* (2006.01)
*G03B 21/22* (2006.01)

(52) U.S. Cl.
CPC ............... *G03B 21/16* (2013.01); *G03B 21/22* (2013.01)

(58) Field of Classification Search
USPC .......... 353/57, 58, 60, 61, 119; 361/676, 678, 361/679.46, 688, 690, 692, 693
See application file for complete search history.

(56) References Cited

U.S. PATENT DOCUMENTS

| | | | |
|---|---|---|---|
| 4,925,295 A * | 5/1990 | Ogawa et al. | 353/57 |
| 6,739,831 B2 * | 5/2004 | Hsu et al. | 415/60 |
| 6,832,838 B2 * | 12/2004 | Wang et al. | 353/119 |
| 6,971,749 B2 * | 12/2005 | Russell et al. | 353/58 |
| 7,484,852 B2 * | 2/2009 | Kuraie | 353/57 |
| 2005/0012905 A1 | 1/2005 | Morinaga | |
| 2005/0213050 A1 | 9/2005 | Suzuki | |
| 2007/0236668 A1 * | 10/2007 | Suzuki | 353/57 |

FOREIGN PATENT DOCUMENTS

| | | |
|---|---|---|
| JP | 3091812 U | 11/2002 |
| JP | 2003-241310 A | 8/2003 |
| JP | 2005-037506 A | 2/2005 |

(Continued)

OTHER PUBLICATIONS

International Search Report in PCT/JP2009/066363 dated Oct. 20, 2009 (English Translation thereof) previously submitted on Mar. 15, 2012.

*Primary Examiner* — William C Dowling
(74) *Attorney, Agent, or Firm* — McGinn IP Law Group, PLLC

(57) ABSTRACT

Provided is a projection type display device that has dust-proof and coolable optical components. According to an aspect of the present invention, the display device includes a case, a dust-proof structure that has a plurality of walls surrounding a plurality of optical components to prevent dust, and which is located in the case, and suction ports (7b and 7b') formed in the case and configured to suck cooling air along one wall of the dust-proof structure to cool the optical components. The suction ports are separated into first suction port (7b) and second suction port (7b') with a position of one wall set as a reference. First suction port (7b) is located to blow the cooling air to the dust-proof structure, while second suction port (7b') is located to prevent direct blowing of the cooling air to the dust-proof structure. An area of first suction port (7b) is smaller than that of second suction port (7b').

16 Claims, 6 Drawing Sheets

(56) References Cited

FOREIGN PATENT DOCUMENTS

| JP | 3108585 U | 4/2005 |
| JP | 2005-234424 A | 9/2005 |
| JP | 2005-283842 A | 10/2005 |
| JP | 2005-352187 A | 12/2005 |
| JP | 2006-171165 A | 6/2006 |
| JP | 2006-189549 A | 7/2006 |
| JP | 2006-301368 A | 11/2006 |
| JP | 2006-309096 A | 11/2006 |
| JP | 2007-093690 A | 4/2007 |
| JP | 2007-171391 A | 7/2007 |
| JP | 2008-225103 A | 9/2008 |
| JP | 2008-281970 A | 11/2008 |
| JP | 2008-292647 A | 12/2008 |

* cited by examiner

DISPLAY DEVICE

TECHNICAL FIELD

The present invention relates to a display device having high cooling efficiency and low noise characteristics. More specifically, the invention relates to a display device that has enhanced dust-proof characteristics and does not require an air filter.

BACKGROUND ART

A projection type display device includes a lamp for emitting light, a projection lens for magnifying and projecting a video, and an optical component such as a DMD (Digital Micromirror Device) that forms an image according to an image signal. In the projection type display device, when it is used, heat is generated in the optical component. Continued use of the display device at a high temperature not only deteriorates display quality but also damages the optical component. Therefore, the display device is generally cooled by air.

However, the projection type display device may be used in a store environment where there is a large flow of people or an outdoor environment where there is much dust, creating a possibility that along with the cooling air, dust may enter the projection type display device. The dust that adheres to the optical component of the projection type display device deteriorates display quality and shortens a life of the optical component. To tackle this problem, a dust-proof technology of the projection type display device has been developed.

JP2006-309096A (hereinafter, Patent Literature 1) discloses a technology for preventing incursion and sticking of dust by surrounding all optical components located from a lamp exit side to a projection lens with a dust-proof wall to seal them. The optical components are completely blocked from the outside, thus exhibiting high dust-proof characteristics. However, the sealed structure prevents heat radiation, hence a problem arises in which the optical components become degraded due to temperature increase.

Patent Literature 1 further discloses a method for blowing cooling air to the part of the lamp that is projected to the outside of the dust-proof wall to cool it. This method is efficient for cooling a lamp of an extremely large temperature increase. However, in Patent Literature 1, there is no mention of cooling of components having heat such as a DMD. In a recent projection type display device that features higher brightness, temperature increases of optical components such as a DMD in addition to a lamp are large, necessitating improvement of cooling efficiency.

JP2003-241310A (Patent Literature 2) and JP2006-189549A (Patent Literature 3) disclose technologies for preventing incursion of dust and improving cooling efficiency by using cooling air dust-removed by an air filter.

However, when the air filter is used, there are problems of roughness and clogging of the air filter. When a rough air filter is used, dust having a particle size smaller than the mesh of the filter cannot be sufficiently removed and is sucked into the projection type display device. When a fine air filter is used, whereas dust having a small particle size can be collected, the dust easily causes clogging of the air filter. The clogging of the air filter makes air suction difficult, consequently reducing cooling efficiency inside the projection type display device. This necessitates cleaning or replacement of the air filter, creating a possibility that burdens on a user will increase and costs will increase.

CITATION LIST

Patent Literature

Patent Literature 1: JP2006-309096A
Patent Literature 2: JP2003-241310A
Patent Literature 3: JP2006-189549A

SUMMARY OF INVENTION

It is therefore an object of the present invention to provide a display device that can solve at least one of the problems described above in the Background Art, for example, a display device that has dust-proof and coolable optical components.

According to an aspect of the present invention, a display device includes a case, a dust-proof structure having a plurality of walls surrounding a plurality of optical components to prevent the incursion of dust, which is located in the case, and suction areas configured to suck cooling air in a direction along one wall of the dust-proof structure from one surface of the case to cool the optical components, which are separated into a first suction port of a side where the dust-proof structure is located and a second suction port of a side where the dust-proof structure is not located with a position of the one wall set as a reference. The area of the first suction port is smaller than that of the second suction port.

According to the present invention, the display device can include dust-proof and coolable optical components.

DESCRIPTION OF EMBODIMENT

Next, an exemplary embodiment of the present invention is described.

Figure 1:
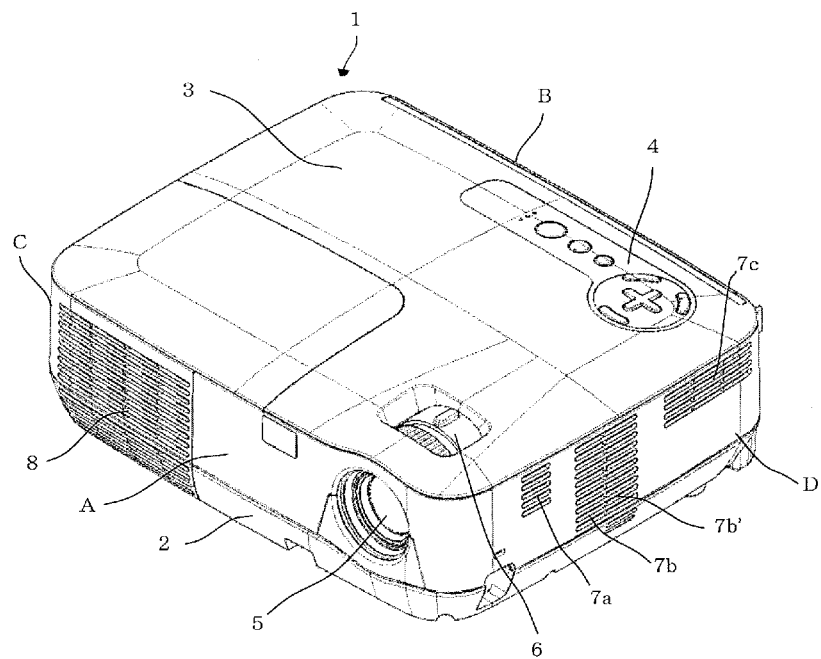
FIG. 1 is a perspective view schematically showing a front face and a left side face of a projection type display device obliquely seen from above according to an exemplary embodiment of the present invention.
Figure 2:
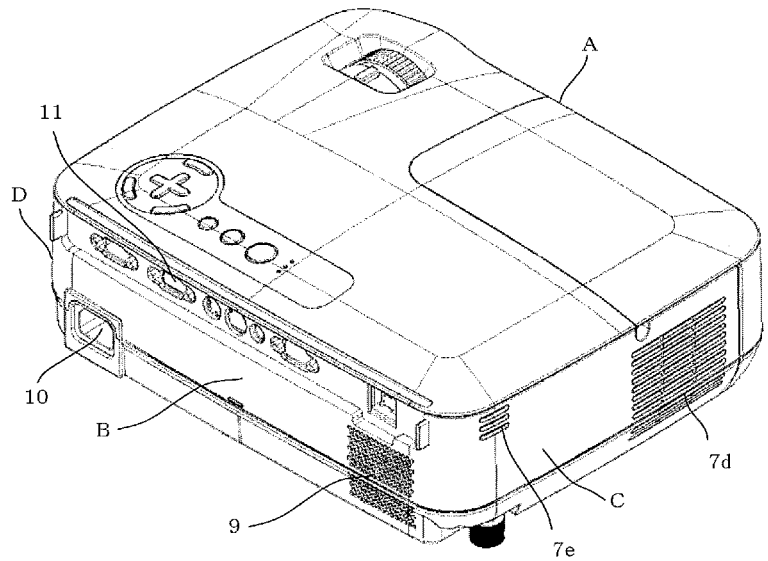
FIG. 2 is a perspective view schematically showing a back face and a right side face of the projection type display device obliquely seen from above according to the exemplary embodiment of the present invention.

FIGS. 1 and 2 are perspective views showing projection type display device 1 according to the exemplary embodiment of the present invention. As shown in FIG. 1, projection type display device 1 is formed into a shape having a roughly rectangular parallelepiped appearance by combining bottom case 2 serving as a base and upper case 3. Upper case 3 forms not only an upper surface (top face) but also a side face of projection type display device 1. The upper surface of upper case 3 includes control button 4 for operating projection type display device 1. The side face of projection type display device 1 includes a hole formed to locate projection lens 5. A video is projected from projection lens 5 through the hole.

Projection lens 5 has a mechanism for magnifying or demagnifying a projected image, namely, focus adjustment, and upper case 3 includes adjustment unit 6 for adjusting the focus of projection lens 5. In projection type display device 1 shown in FIGS. 1 and 2, adjustment unit 6 is located in the upper surface of upper case 3.

A user of projection type display device 1 normally operates projection type display device 1 from a side opposite the face where projection lens 5 is located. Thus, in the description, the face where projection lens 5 of projection type display device 1 is located is set as front face A, a face opposite front face A is set as back face B, a face located right when front face A is seen from back face B is set as right side face C, and a face opposite right side face C is set as left side face D. Thus, FIG. 1 schematically shows front face A and left side face D of display device 1, while FIG. 2 schematically shows back face B and right side face C of display device 1.

As shown in FIG. 1, on left side face D of projection type display device 1, suction ports 7a, 7b, 7b', and 7c are formed in this order from front face A to the back face B to suck cooling air into projection type display device 1. On front face A, exhaust port 8 is formed to exhaust air from projection display device 1. As shown in FIG. 2, on right side face C of projection type display device 1, suction ports 7d and 7e are formed in this order from front face A to back face B.

Back face B includes speaker hole 9 for discharging sound of projection type display device 1 to the outside, AC (Alternating Current) inlet 10 for supplying power from the outside, and I/O (Input/Output) terminal 11 for receiving/outputting video information.

As described above, the suction areas are formed on right side face C and left side face D of projection type display device 1, and the exhaust port is formed on front face A. However, back face B includes no suction or exhaust port while it includes speaker hole 9. This arrangement of the suction ports and the exhaust port gives no uncomfortable feeling to the user for the following reason. That is, since the user uses projection display device 1 on the back face B side, air that is set to a high temperature in the device is exhausted far from the user because the air is exhausted from the front face A side. The inclusion of the suction ports on right side face C and left side face D enables suppression of radiation of noise generated during suction to the user.

Furthermore, a gap between projection lens 5 and front face A of upper case 3 is designed as small as possible, which suppresses a flow of sucked air through the gap between projection lens 5 and upper case 3. Similarly, a gap between adjustment unit 6 and upper case 3 is designed as small as possible to suppress flowing-in/out of air.

Next, an internal structure and at operation of projection type display device 1 are described.

Figure 3:
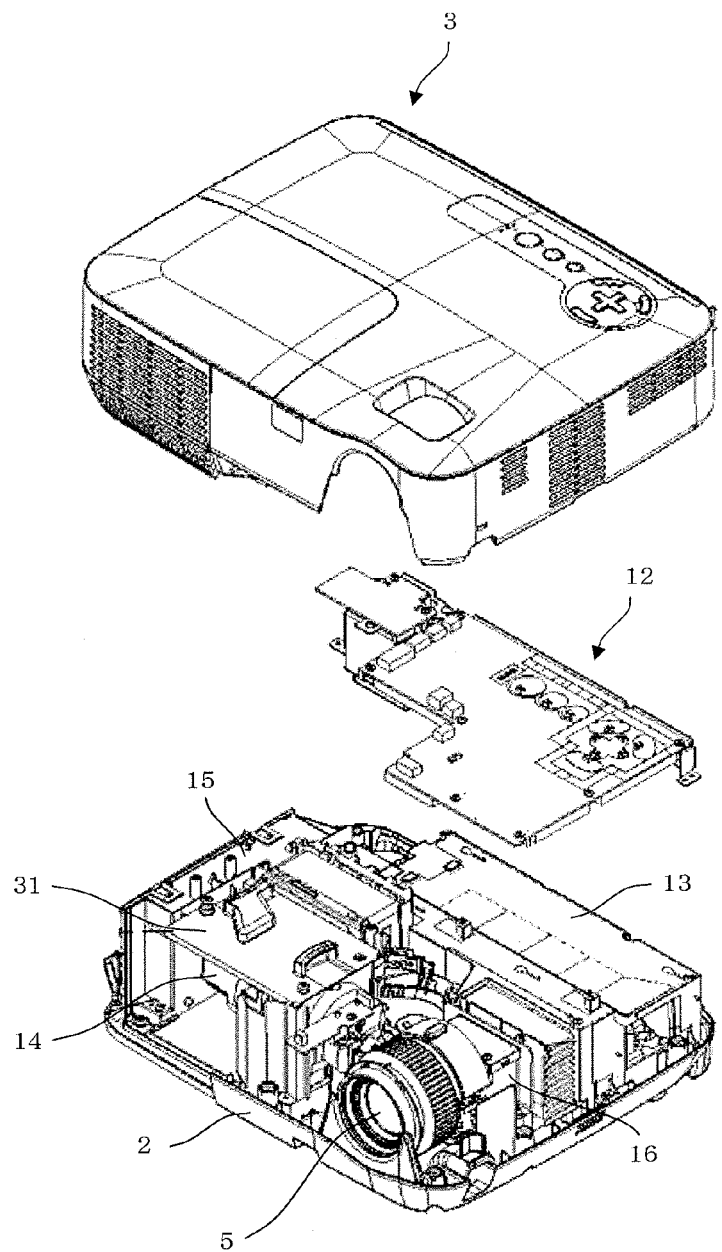
FIG. 3 is a perspective view showing the projection type display device shown in FIG. 1 when it is separated into an upper case and a lower case.

FIG. 3 is a perspective view when bottom case 12 and upper case 13 are separated from each other and the inside of projection type display device 1 is seen. In FIG. 3, main substrate 12 including a circuit element is also removed. Inside projection type display device 1, power source 13 is disposed on back face B side to receive power from the outside, and ballast 15 is disposed on right side face C side to stably light lamp 14 serving as a light source. Lamp unit 31 constituting lamp 14 is located at a corner formed by front face A and right side face C, and optical engine 16 including a plurality of optical components is located at a corner formed by front face A and left side face D.

When power is supplied to power source 13 from the outside via AC inlet 10 (FIG. 2) formed on back face B, power is supplied from light source 13 to ballast 15 and main substrate 12. When the user presses a power button of projection type display device 1, projection type display device 1 is activated, and light is emitted from lamp 14 by ballast 15. The light emitted from lamp 14 enters optical engine 16, and exits from projection lens 5.

Figure 4:
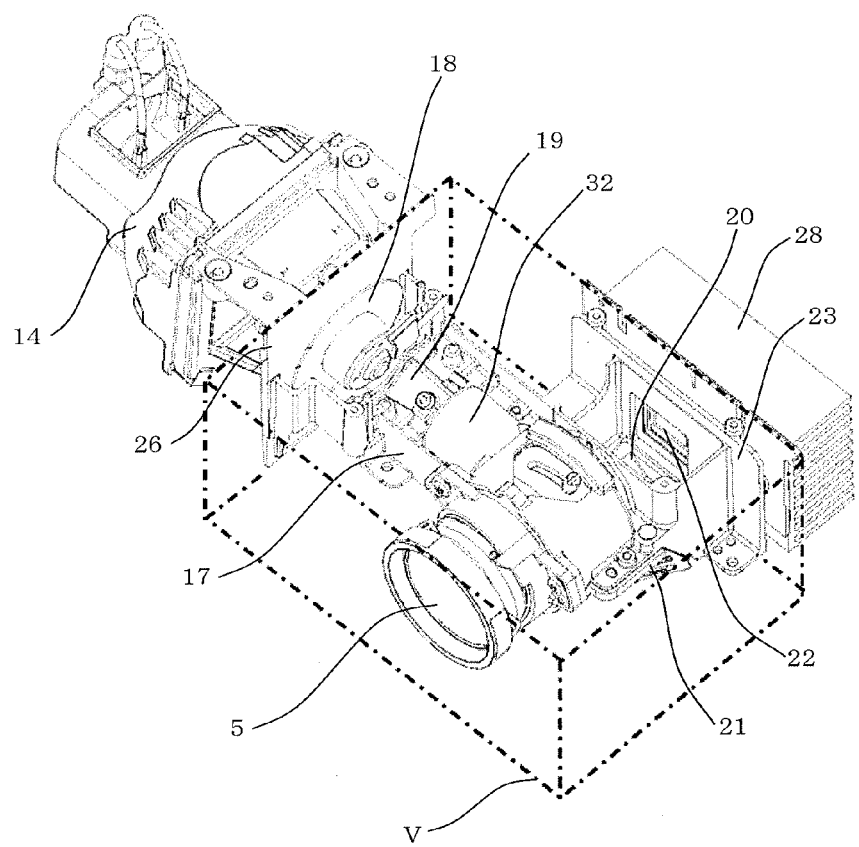
FIG. 4 is a perspective view showing a lamp and an optical engine used inside the projection type display device according to the exemplary embodiment of the present invention.

FIG. 4 is an enlarged perspective view showing lamp 14 and optical engine 16. Optical engine 16 includes color wheel 18 for dividing light, light tunnel 19 for making a light luminance distribution uniform, condenser lens 20 for condensing light, reflection mirror 21, DMD 22 driven by an electric signal, and optical engine base 17 for mounting these optical components.

The light emitted from lamp 14 enters optical engine 16, and sequentially passes through color wheel 18, light tunnel 19, and condenser lens storage unit 32 for storing two condenser lenses 20 to be reflected toward DMD 22 by reflection mirror 21. The reflected light passes through condenser lens 20 located between reflection mirror 21 and DMD 22 to illuminate DMD 22.

DMD 22 is driven according to a video signal acquired by DMD substrate 23 and main substrate 12 shown in FIG. 3 to generate a video, and transmits the video to projection lens 5. The video is magnified by projection lens 5 to be displayed on a screen. According to the exemplary embodiment of the present invention, the optical axis of the lamp and the optical axis of DMD 24 after reflection are set orthogonal to each other by reflection mirror 21 and DMD 22.

The light is condensed within the range from color wheel 18 to projection lens 5. Thus, when the optical components are stained by powder dust, transmittance or reflectance is reduced, causing the video projected from projection lens 5 to be dark.

During the displaying operation on the screen, the temperature of the electronic components or the optical components increases due to self heat generation or heat absorption. When the powder dust sticks to the optical components causing a reduction in transmittance or reflectance, the amount of light absorbed by the optical components increases, hence the temperature of the optical components sharply increases. The increased temperature of the electronic components or the optical components may expedite degradation of the components to cause performance reduction or damage.

Figure 5:
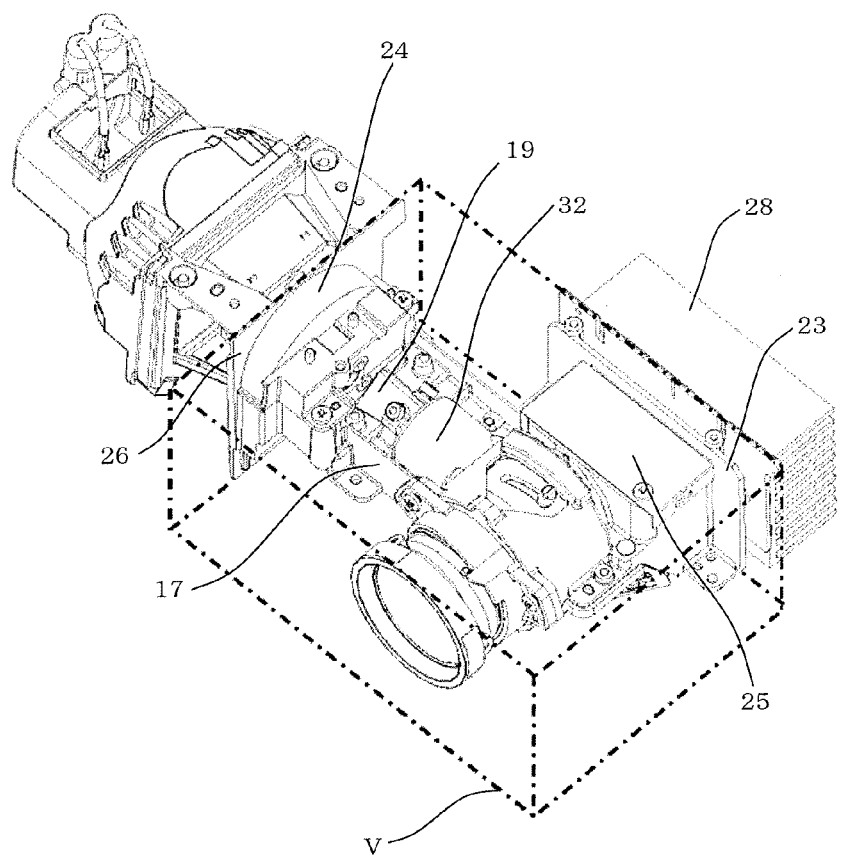
FIG. 5 is an explanatory view showing dust-proof means concerning the optical engine shown in FIG. 4.

Thus, in projection type display device 1, dust prevention and cooling inside optical engine 16, namely, an area from color wheel 18 to projection lens 5 where the light travels (rectangular parallelepiped area surrounded with the dotted line shown in FIG. 4, hereinafter referred to as dust-proof area V) are important. Referring to FIG. 5, dust-proof measures of optical engine 16 are described.

As shown in FIG. 5, light tunnel 19 and condenser storage unit 32 are covered with a wall surface constituting optical engine base 17. Color wheel 18 is covered with color wheel dust-proof case 24, and DMD 22 is also covered with DMD dust-proof case 25. These measures are taken to prevent sticking of the powder dust to the optical components.

However, it is difficult to completely prevent incursion of powder dust by using only optical engine base 17 or dust-proof cases 24 and 25 because of assembly tolerance. When cooling air accompanied by powder dust around the dust-proof case passes at a large flow rate, the powder dust may enter the case from a gap of each dust-proof case, thereby causing sticking of the powder dust to the optical components. Thus, the present invention provides higher dust-proof capability while preventing a temperature increase of the optical components by not only blocking the optical components from dust but also by suppressing passage of cooling air containing powder dust into the dust-proof area V.

Specifically, in FIGS. 4 and 5, as means for suppressing the cooling air of the dust-proof area V, bottom case 2 and the upper surface and the side face of upper case 3 are used. As described below in detail, a dust-proof structure is formed by using rib structure wall 26 for disposing color wheel 18 of optical engine base 17 and DMD substrate 23 as boundaries of the dust-proof area V.

Figure 6:
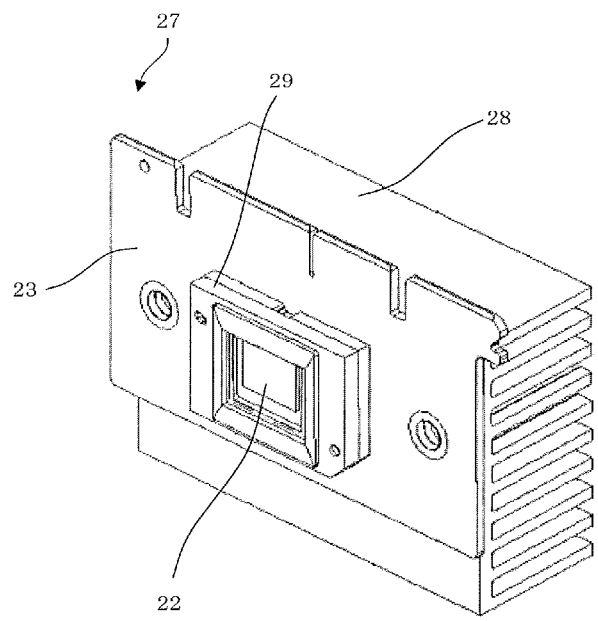
FIG. 6 is a perspective view showing a DMD unit used inside the projection type display device according to the exemplary embodiment of the present invention.

FIG. 6 is a perspective view showing DMD unit 27 for stably driving DMD 22. DMD 22 is located in socket 29 mounted on DMD substrate 23. One surface of DMD 22 is brought into direct contact with a heat reception surface of heat sink 28 serving as a heat radiation component. Thus, a temperature increase caused by light illumination around DMD 22 is suppressed by heat radiation from a surface of DMD 22 or heat sink 28.

A surface of DMD 22 not in contact with heat sink 28 is inside the dust-proof area V, and direct blowing of much cooling air to the surface is not advisable. Thus, according to the present invention, DMD 22 is efficiently cooled by blowing much cooling air to heat sink 28 immediately after its flowing-in from outside projection type display device 1. By causing DMD substrate 23 to function as a dust-proof wall, even when much cooling air is blown to heat sink 28, flowing of the cooling air into the dust-proof area V is suppressed, and sticking of powder dust to DMD 22 is suppressed.

Figure 7:
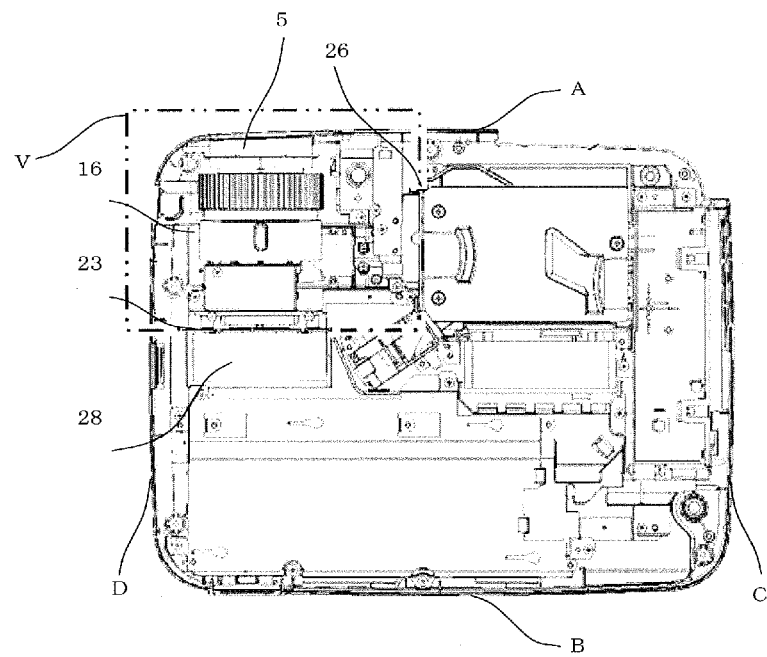
FIG. 7 is a top view showing the projection type display device in a removed state of the upper case and a main substrate according to the exemplary embodiment of the present invention.

FIG. 7 is a top view showing projection type display device 1 in a removed state of upper case 3 and main substrate 12. As shown in FIG. 7, optical engine 16 and projection lens 5 are located in the inside area (two-dot chain line area shown in FIG. 7) of the corner between front face A and left side face D of projection type display device 1. Bottom case 2 and the upper surface, front face A, and left side face D of upper case 3 accordingly constitute the dust-proof wall of dust-proof area V surrounded with the dotted line shown in FIG. 4. DMD substrate 23 and rib structure wall 26 block the back face B side and the right side face C side of the dust-proof area V from dust.

DMD substrate 23 and rib structure wall 26 are structured to cover parts of the back face B side and the right side face C side of dust-proof area V, thereby suppressing the flow of the cooling air into dust-proof area V. Main substrate 12 is located on DMD substrate 23 and rib structure wall 26, and brought into contact with upper case 3, thereby improving the strength of projection type display device 1. Heat sink 28 is located outside the dust-proof area V to radiate heat of a component having heat such as DMD 22 to the outside of dust-proof area V.

Next, the flow of the cooling air inside projection type display device 1, which is a feature of the present invention, and the position and the size of the opening through which the flow is created are described in detail.

Figure 8:
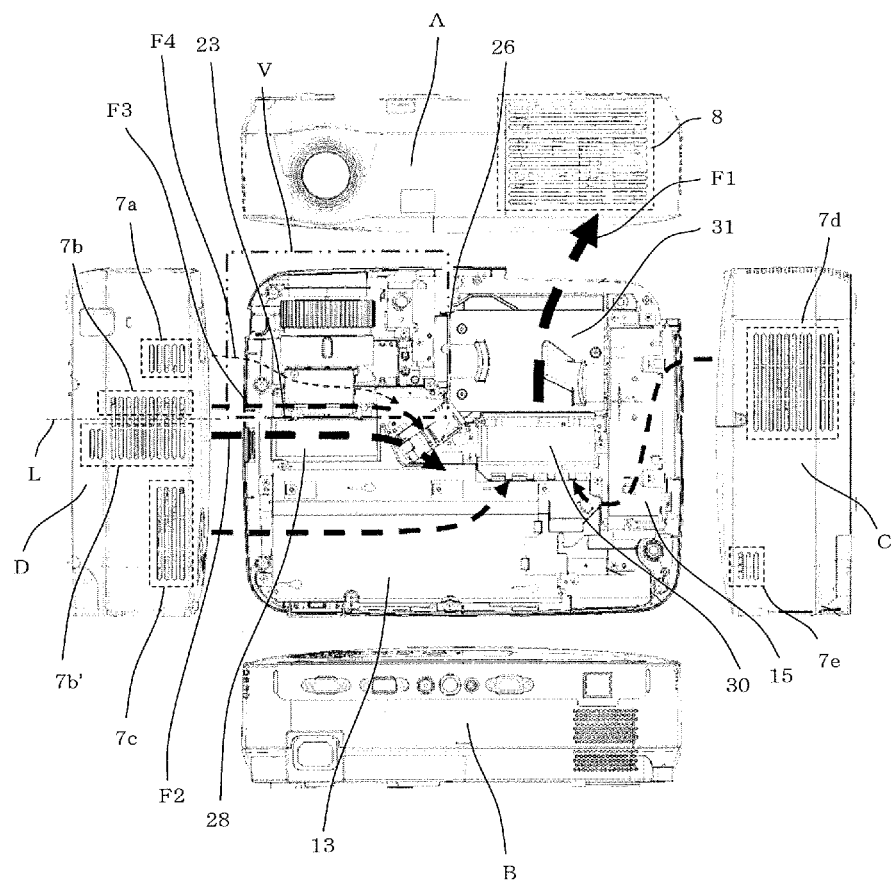
FIG. 8 is a top view of the device in the state shown in FIG. 7, showing a side face of the upper case equivalent to each side face of the device around the top view.

FIG. 8 shows the top face of projection type display device 1 in the removed state of upper case 3 and main substrate 12 in the center, and an external view of the side face of upper case 3 equivalent to each side face of device 1 around the top face. In the top face of the center, a flow of cooling air is indicated by a dotted-line arrow. The width of the dotted line indicates the flow rate, and the direction of the arrow indicates the flowing direction.

As shown in FIG. 8, to circulate the cooling air in projection type display device 1, cooling fan 30 is disposed adjacently to back face B side of lamp unit 31. In other words, cooling fan 30 is located in the center of projection type display device 1. Thus, noise generated by spatial resonance inside projection type display device 1 and noise radiated from the suction ports or the exhaust port formed in upper case 3 are suppressed.

Cooling fan 30, which is located so that its blowing direction can be toward lamp unit 1, sends the cooling air from around the center of projection type display device 1 toward lamp unit 31 (flow F1 of cooling air). The cooling air, which has cooled lamp unit 31, is discharged from exhaust port 8 formed in the front face A to the outside. In this case, rib structure wall 26 suppresses flowing to the dust-proof area V (two-dot chain line area shown in FIG. 8).

Cooling fan 30 uniformly sucks fluids from the surroundings. Thus, locating cooling fan 30 near the center of projection type display device 1 can provide the effect of supplying cooling air into projection type display device 1 according to areas of the suction ports. Needless to say, a density of the mounted components with respect to a space of the mounted components inside projection type display device 1 influences the amount of inflow of cooling air. However, because of almost uniform mounting of the components, the positions and sizes of the suction ports formed in upper case 3 determine the volume and a velocity of cooling air sucked into projection type display device 1.

According to the exemplary embodiment of the present invention, the suction ports are formed in right side face C and the left side face D of projection type display device 1. Referring to FIG. 8, the positions and sizes of the suction ports are described.

First suction port 7b and second suction port 7b' are located near DMD substrate 23, and a boundary between first suction port 7b and second suction port 7b' matches extended line L of DMD substrate 23. In other words, the suction ports are separated into first suction port 7b and second suction port 7b' with DMD substrate 23 set as a reference. An opening of front face A side from extended line L is first suction port 7b, while an opening of back face B side is second suction port 7b'. In this case, by setting the area of second suction port 7b' to be larger than that of first suction port 7b, the amount of cooling air flowing from second suction port 7b' into the device is larger than that from first suction port 7b.

Flow F2 of the cooling air sucked from second suction port 7b' passes, because of the function of the dust-proof wall of DMD substrate 23, through heat sink 28 without entering dust-proof area V to move toward cooling fan 30. Because of no entry into the dust-proof area V, a flow rate of the cooling air toward cooling fan 30 can be increased. Heat sink 28 is located near second suction port 7b', and hence heat sink 28 is cooled by the cooling air immediately after its suction, namely, air of about room temperature.

Flow F3 of the cooling air sucked from first suction port 7h, which is weaker than flow F2 because of a small area of first suction port 7b, can cool DMD unit 27 located in dust-proof area V without any powder dust flowing into dust-proof cases 24 and 25. Flow F3, which has advanced along DMD substrate 23, merges with flow F2 from a place where DMD substrate 23 does not cover back face B side of the dust-proof area V to move toward cooling fan 30.

Third suction port 7a is an opening located nearer to the front face A side than first suction port 7b. An area of suction port 7a is smaller than that of suction port 7b, and flow F4 of cooling air sucked from third suction port 7a is weaker than flow F3. Thus, flow F4 can also pass inside dust-proof area V without any powder dust flowing into dust-proof cases 24 and 25. Flow F4 merges with flow F3 and flow F2 before it reaches right side face C of dust-proof area V to move toward cooling fan 30. Heat in the dust-proof area V can be moved to cooling fan 30.

In an area of front face A facing dust-proof area V, an opening is formed to project light from projection lens 5. A minimum gap is formed between the opening and projection lens 5 to suppress flowing of air from the outside. No other openings are formed in the area of front face A facing dust-proof area V. Because no other openings are formed, stabilizing the path of flow F4 by preventing the flow of air and powder dust from front face A into the device can be achieved.

Fourth suction port 7c is formed nearer to the back face B side than second suction port 7b'. Cooling air sucked from fourth suction port 7c cools power source 13.

In this case, the sum of areas of second suction port 7b' and fourth suction port 7c is set larger than that of areas of first suction port 7b and third suction port 7a. The volume and the velocity of cooling air flowing outside dust-proof area V from DMD substrate 23 to power source 23 can be set larger than that of the cooling air flowing in dust-proof area V. When there is a plurality of third suction ports 7a or fourth suction ports 7c, comparison only needs to be made based on a sum total of areas of the suction ports.

Ballast 15 for stably emitting light from lamp 14, which is located nearer to right side face C side than cooling fan 30, is cooled by cooling air flowing in from fifth suction port 7d and sixth suction port 7e. It is desired that areas of fifth suction port 7d and sixth suction port 7e be smaller than the sum total of areas of first to fourth suction ports 7a, 7b, 7b', and 7c. By limiting the areas of fifth suction port 7d and sixth suction port 7e, the amount of cooling air flowing in from first to fourth suction ports 7a, 7b, 7V, and 7c and cooling air flowing in from fifth suction port 7d and sixth suction port 7e can be maintained with good balance.

In the exemplary embodiment of the present invention, the area of first suction port 7b is 410 mm$^2$, the area of second suction port 7b' is 825 mm$^2$, the area of third suction port 7a is 264 mm$^2$, and the area of fourth suction port 7c is 659 mm$^2$. The area of fifth suction port 7d is 769 mm$^2$, and the area of sixth suction port 7e is 152 mm$^2$. For cooling fan 30, an axial-flow fan that is simple in structure and that requires no space is used.

The arrangement and the size of the suction ports enable cooling of DMD unit 27 by cooling air immediately after its entry from the outside of projection type display device 1. Lamp unit 31 is cooled by all the cooling air entered from the suction ports. The inside of the dust-proof area V including DMD 22 can be efficiently cooled by a very small amount of cooling air. As a result, without using any air filter, the main optical components can be shielded from dust. Even one cooling fan 30 that exhausts the cooling air from projection type display device 1 to the outside provides sufficient cooling, thereby achieving a low-noise projection type display device.

The exemplary embodiment has been directed to the projection type display device. However, the present invention can be applied for cooling a device that stores a heat generation component in a case, and configured as such.

The exemplary embodiment of the present invention has been described. However, the present invention is not limited to the exemplary embodiment. Various changes understandable to those skilled in the art can be made to the configuration and to the specifics of the present invention within the scope of the technological ideas of the invention.

EXPLANATION OF REFERENCE NUMERALS 1 projection type display device
2 bottom case
3 upper case
5 projection lens
7a, 7b, 7b', 7c, 7d, 7c suction port
8 exhaust port
13 power source
14 lamp
15 ballast
16 optical engine
17 optical engine base
18 color wheel
19 light tunnel
22 DMD
23 DMD substrate
24 color wheel dust-proof case
25 DMD dust-proof case
26 rib structure wall
27 DMD unit
28 heat sink
30 cooling fan
31 lamp unit

What is claimed is:

1. A display device, comprising:
a case;
a dust-proof structure having a plurality of walls surrounding a plurality of optical components to prevent dust, and which is located in the case; and
suction areas configured to suck cooling air in a direction along one wall of the dust-proof structure from one surface of the case to cool the optical components,
wherein, in a plan view, with respect to a line that extends along the one wall of the dust-proof structure, the suction areas are separated into:
a first suction port on a side of the line where the dust-proof structure is located; and
a second suction port on a side of the line where the dust-proof structure is not located,
wherein an area of the first suction port is smaller than an area of the second suction port, and
wherein the one wall includes a substrate mounting a component having heat inside the dust-proof structure, and a heat radiation component radiating the heat of the component outside the dust-proof structure.

2. The display device according to claim 1, wherein the one surface of the case includes at least one third suction port on a side farther from a position of the one wall than the first suction port.

3. The display device according to claim 2, wherein the one surface of the case includes at least one fourth suction port on a side farther from the position of the one wall than the second suction port.

4. The display device according to claim 3, wherein a sum of areas of the second suction port and the fourth suction port is larger than a sum of areas of the first suction port and the third suction port.

5. The display device according to claim 1, further comprising a cooling fan sucking the cooling air in a center inside the case.

6. The display device according to claim 2, further comprising a cooling fan sucking the cooling air in a center inside the case.

7. The display device according to claim 3, further comprising a cooling fan sucking the cooling air in a center inside the case.

8. The display device according to claim 4, further comprising a cooling fan sucking the cooling air in a center inside the case.

9. The display device according to claim 1, wherein the case includes a surface in which a projection lens projecting a video is located,
the device further comprising an exhaust port exhausting the cooling air in the surface in which the projection lens projects.

10. The display device according to claim 2, wherein the case includes a surface in which a projection lens projecting a video is located,
the device further comprising an exhaust port exhausting the cooling air in the surface in which the projection lens projects.

11. The display device according to claim 3, wherein the case includes a surface in which a projection lens projecting a video is located,
the device further comprising an exhaust port exhausting the cooling air in the surface in which the projection lens projects.

12. A display device, comprising:
a case;
a dust-proof structure having a plurality of walls surrounding a plurality of optical components to prevent dust, and which is located in the case;
suction areas configured to suck cooling air in a direction along one wall of the dust-proof structure from one surface of the case to cool the optical components,
wherein, in a plan view, with respect to a line that extends along the one wall of the dust-proof structure, the suction areas are separated into:
a first suction port on a side of the line where the dust-proof structure is located; and
a second suction port on a side of the line where the dust-proof structure is not located, and
wherein an area of the first suction port is smaller than an area of the second suction port,
a cooling fan sucking the cooling air in a center inside the case, the case including a surface in which a projection lens projecting a video is located, and an exhaust port exhausting the cooling air in the surface; and
a light source supplying light to the projection lens,
wherein the light source is located between the cooling fan and the exhaust port, and a blowing direction of the cooling fan is toward the light source.

13. The display device according to claim 12, further comprising a third suction port in a surface different from the one surface of the case,
wherein an area of the third suction port is smaller than a sum of areas of the suction ports formed in the one surface of the case.

14. The display device according to claim 13, further comprising a power source supplying power to the dust-proof structure,
wherein a part of the power source is located near the third suction port.

15. The display device according to claim 13, wherein the one surface of the case and the surface including the third suction port are not adjacent to each other.

16. The display device according to claim 13, wherein the one surface of the case and the surface including the third suction port face each other.

* * * * *